United States Patent [19]

Kawamura et al.

[11] Patent Number: 4,783,837
[45] Date of Patent: Nov. 8, 1988

[54] IMAGE PROCESSING APPARATUS

[75] Inventors: Naoto Kawamura, Anagi; Hidejiro Kadowaki, Yokohama, both of Japan

[73] Assignee: Canon Kabushiki Kaisha, Tokyo, Japan

[21] Appl. No.: 881,492

[22] Filed: Jul. 1, 1986

Related U.S. Application Data

[63] Continuation of Ser. No. 480,823, Mar. 31, 1983, abandoned.

[30] Foreign Application Priority Data

Apr. 6, 1982 [JP] Japan ................................ 57-56964
Apr. 6, 1982 [JP] Japan ................................ 57-56965

[51] Int. Cl.⁴ ............................................. G06K 9/00
[52] U.S. Cl. ..................................... 382/50; 358/282; 358/283
[58] Field of Search ................. 382/50; 358/282, 283, 358/216, 298

[56] References Cited

U.S. PATENT DOCUMENTS

| | | | |
|---|---|---|---|
| 3,739,084 | 6/1973 | Heinrich | 358/283 |
| 3,742,129 | 6/1973 | Roberts et al. | 178/5.4 CD |
| 3,878,559 | 4/1975 | Pugsley | 358/75 |
| 4,196,451 | 4/1980 | Pellar | 358/283 |
| 4,251,837 | 2/1981 | Janeway, III | 358/283 |
| 4,430,748 | 2/1984 | Tuhro et al. | 382/50 |
| 4,486,788 | 12/1984 | Yamada | 358/283 |
| 4,496,987 | 1/1985 | Yuasa et al. | 358/283 |
| 4,507,685 | 3/1985 | Kawamura | 358/283 |
| 4,547,811 | 10/1985 | Ochi et al. | 358/283 |

FOREIGN PATENT DOCUMENTS

| | | |
|---|---|---|
| 2253338 | 6/1975 | France . |
| 1355540 | 6/1974 | United Kingdom . |
| 1448112 | 9/1976 | United Kingdom . |
| 2026283 | 1/1980 | United Kingdom . |
| 2026811 | 2/1980 | United Kingdom . |
| 2066612 | 7/1981 | United Kingdom . |
| 2087683 | 5/1982 | United Kingdom . |
| 2103449 | 2/1983 | United Kingdom . |

OTHER PUBLICATIONS

"Electronic Halftoning for Color Reproduction", P. Stucki, IBM Technical Disclosure Bulletin, vol. 20, No. 6, Nov. 1977, pp. 2423–2425.

Primary Examiner—Leo H. Boudreau
Attorney, Agent, or Firm—Fitzpatrick, Cella, Harper & Scinto

[57] ABSTRACT

An image processing apparatus comprises an input device for inputting an image data, a first converter circuit for converting the input image signal to an analog image output and a second converter circuit for converting the input image data to a digital image output. The first converter circuit controls the analog image output in accordance with the output of the second converter circuit. The second converter circuit produces different digital signals in accordance with the input image data and has a threshold matrix to be compared with the input image data.

26 Claims, 23 Drawing Sheets

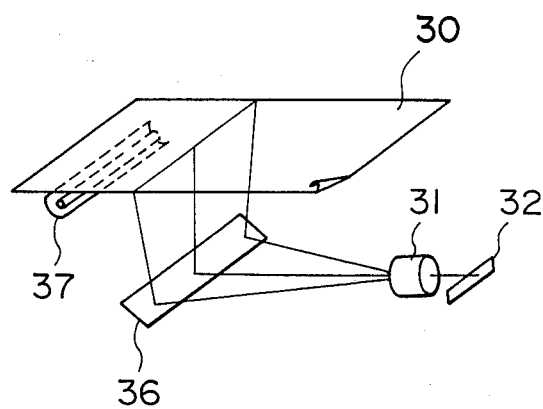
F I G. 5
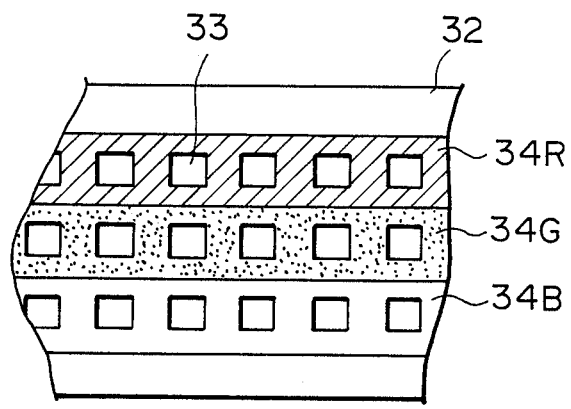
F I G. 6

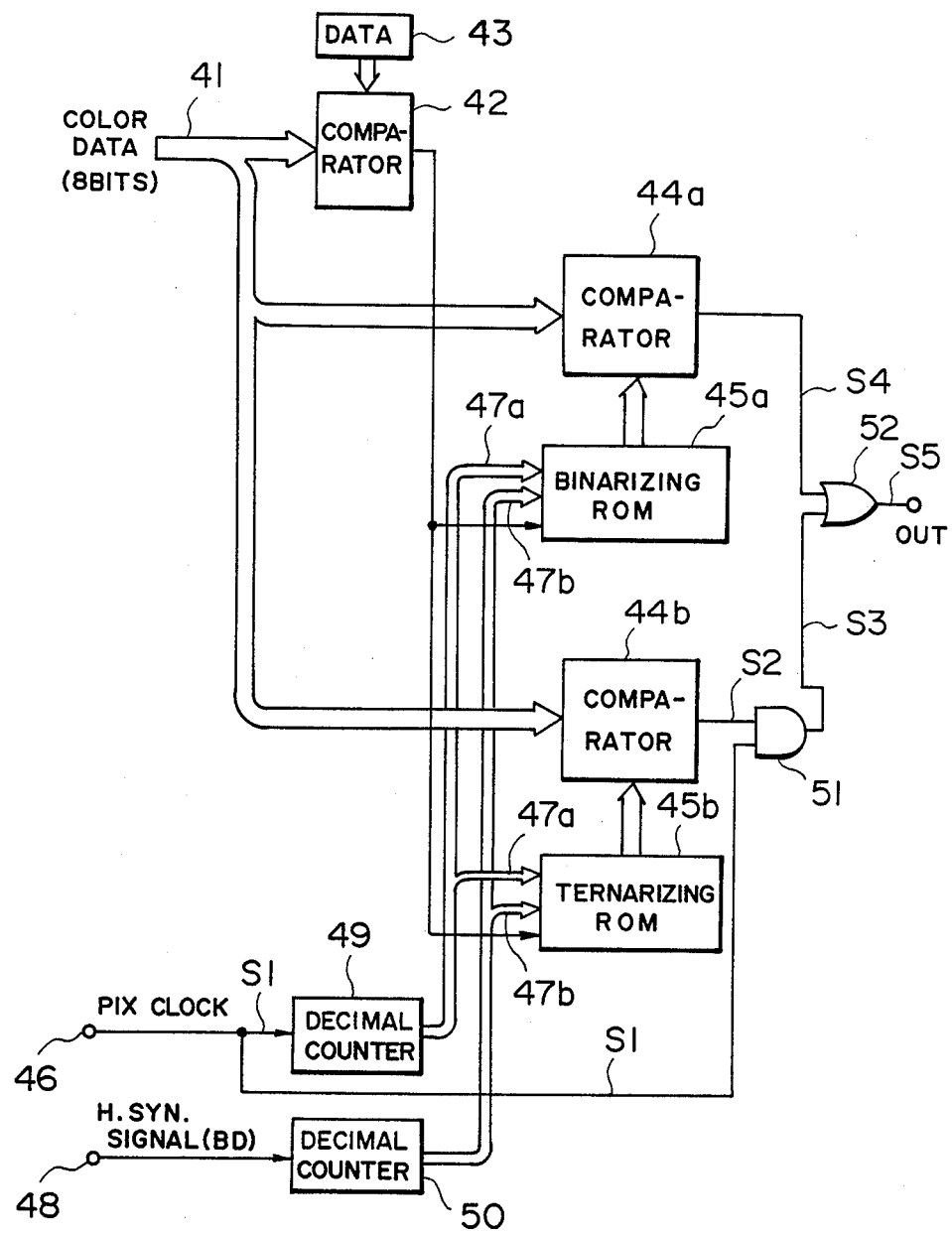
F I G. 10

| 44 | 64 | 91 | 71 | 68 | 28 | 7 | 13 | 58 | 98 |
|---|---|---|---|---|---|---|---|---|---|
| 84 | 100 | 51 | 31 | 88 | 48 | 18 | 23 | 38 | 78 |
| 66 | 26 | 5 | 11 | 56 | 96 | 43 | 63 | 91 | 71 |
| 86 | 46 | 16 | 21 | 36 | 76 | 83 | 100 | 51 | 31 |
| 56 | 96 | 41 | 61 | 93 | 73 | 66 | 26 | 6 | 11 |
| 36 | 76 | 81 | 100 | 53 | 33 | 86 | 46 | 16 | 21 |
| 94 | 74 | 68 | 28 | 8 | 13 | 58 | 98 | 41 | 61 |
| 54 | 34 | 88 | 48 | 18 | 23 | 38 | 78 | 81 | 100 |
| 9 | 14 | 59 | 99 | 43 | 63 | 93 | 73 | 69 | 29 |
| 19 | 24 | 39 | 79 | 83 | 100 | 53 | 33 | 89 | 49 |

F I G. 11A

| 100 | 100 | 90 | 70 | 67 | 27 | 4 | 12 | 57 | 97 |
|---|---|---|---|---|---|---|---|---|---|
| 100 | 100 | 50 | 30 | 87 | 47 | 17 | 22 | 37 | 77 |
| 65 | 25 | 4 | 10 | 55 | 95 | 42 | 62 | 90 | 70 |
| 85 | 45 | 15 | 20 | 35 | 75 | 82 | 100 | 50 | 30 |
| 55 | 95 | 40 | 60 | 92 | 72 | 65 | 25 | 4 | 10 |
| 35 | 75 | 80 | 100 | 52 | 32 | 85 | 45 | 15 | 20 |
| 100 | 100 | 67 | 27 | 4 | 12 | 57 | 97 | 40 | 60 |
| 100 | 100 | 87 | 47 | 17 | 22 | 37 | 77 | 80 | 100 |
| 4 | 100 | 100 | 100 | 42 | 62 | 100 | 100 | 100 | 100 |
| 100 | 100 | 100 | 100 | 82 | 100 | 100 | 100 | 100 | 100 |

F I G. 11C

| 100 | 100 | 100 | 100 | 100 | 100 | 100 | 100 | 100 | 100 |
|-----|-----|-----|-----|-----|-----|-----|-----|-----|-----|
| 100 | 100 | 100 | 100 | 100 | 100 | 100 | 100 | 100 | 100 |
| 100 | 100 | 2   | 100 | 100 | 100 | 100 | 100 | 100 | 100 |
| 100 | 100 | 100 | 100 | 100 | 100 | 100 | 100 | 100 | 100 |
| 100 | 100 | 100 | 100 | 100 | 100 | 100 | 100 | 100 | 100 |
| 100 | 100 | 100 | 100 | 100 | 100 | 100 | 100 | 100 | 100 |
| 100 | 100 | 100 | 100 | 100 | 100 | 100 | 100 | 100 | 100 |
| 100 | 100 | 100 | 100 | 100 | 100 | 100 | 3   | 100 | 100 |
| 100 | 100 | 100 | 100 | 100 | 100 | 100 | 100 | 100 | 100 |
| 100 | 100 | 100 | 100 | 100 | 100 | 100 | 100 | 100 | 100 |

FIG. 11B

| 100 | 100 | 100 | 100 | 100 | 100 | 100 | 100 | 100 | 100 |
|-----|-----|-----|-----|-----|-----|-----|-----|-----|-----|
| 100 | 100 | 100 | 100 | 100 | 100 | 100 | 100 | 100 | 100 |
| 100 | 100 | 1   | 100 | 100 | 100 | 100 | 100 | 100 | 100 |
| 100 | 100 | 100 | 100 | 100 | 100 | 100 | 100 | 100 | 100 |
| 100 | 100 | 100 | 100 | 100 | 100 | 100 | 100 | 100 | 100 |
| 100 | 100 | 100 | 100 | 100 | 100 | 100 | 100 | 100 | 100 |
| 100 | 100 | 100 | 100 | 100 | 100 | 100 | 100 | 100 | 100 |
| 100 | 100 | 100 | 100 | 100 | 100 | 100 | 1   | 100 | 100 |
| 100 | 100 | 100 | 100 | 100 | 100 | 100 | 100 | 100 | 100 |
| 100 | 100 | 100 | 100 | 100 | 100 | 100 | 100 | 100 | 100 |

FIG. 11D

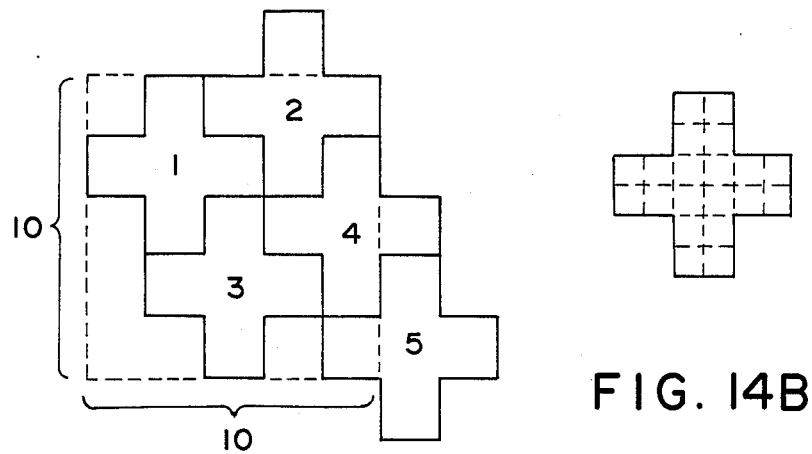
FIG. 14A
FIG. 14B
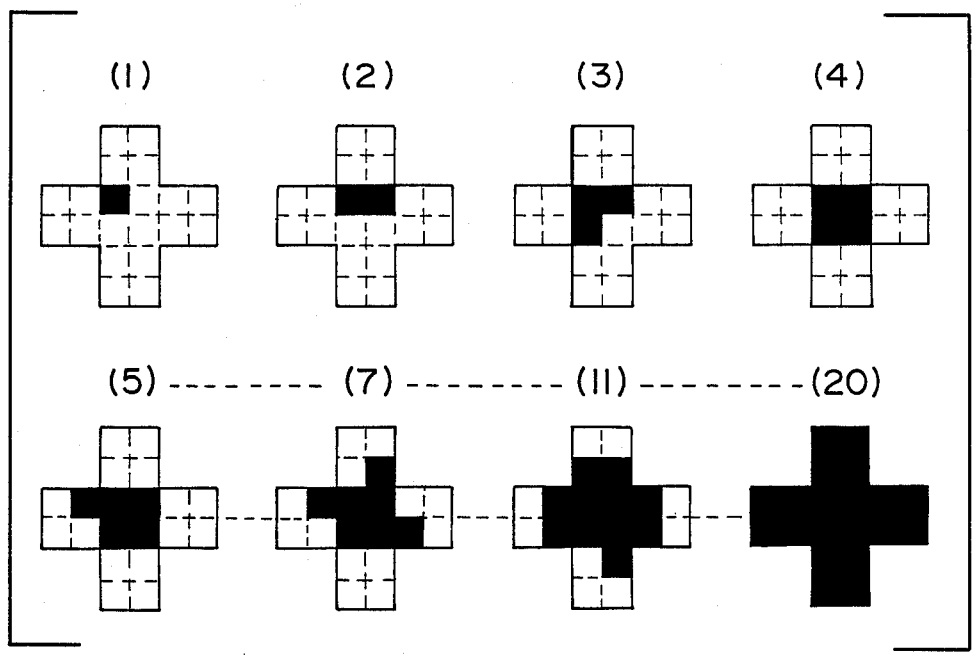
FIG. 15

| 54 | 38 | 23 | 58 | 56 | 40 | 25 | 60 |
|----|----|----|----|----|----|----|----|
| 19 | 1  | 7  | 42 | 21 | 2  | 9  | 44 |
| 34 | 11 | 15 | 27 | 36 | 13 | 17 | 29 |
| 50 | 30 | 46 | 61 | 52 | 32 | 48 | 63 |
| 56 | 40 | 25 | 60 | 54 | 38 | 23 | 58 |
| 21 | 2  | 9  | 44 | 19 | 1  | 7  | 42 |
| 36 | 13 | 17 | 29 | 34 | 11 | 15 | 27 |
| 52 | 32 | 48 | 63 | 50 | 30 | 46 | 61 |

FIG. 21A

| 55 | 39 | 24 | 59 | 57 | 41 | 26 | 60 |
|----|----|----|----|----|----|----|----|
| 20 | 3  | 8  | 43 | 22 | 5  | 10 | 45 |
| 35 | 12 | 16 | 28 | 37 | 14 | 18 | 29 |
| 51 | 31 | 47 | 62 | 53 | 33 | 49 | 64 |
| 57 | 41 | 26 | 61 | 55 | 39 | 24 | 59 |
| 22 | 6  | 10 | 45 | 20 | 4  | 8  | 43 |
| 37 | 14 | 18 | 29 | 35 | 12 | 16 | 28 |
| 53 | 33 | 49 | 64 | 51 | 31 | 47 | 62 |

FIG. 21B

IMAGE PROCESSING APPARATUS

This application is a continuation of application Ser. No. 480,823, filed Mar. 31, 1983, now abandoned.

BACKGROUND OF THE INVENTION

1. Field of the Invention

The present invention relates to an image processing apparatus for recording and displaying an image, and more particularly to improvement in the resolution and tonality of a half-toner image recorded or displayed by a laser beam printer or an ink jet printer.

2. Description of the Prior Art

Many methods to produce a half-tone image in a digital printer have been proposed. Examples thereof are a dither method and a density pattern method. These methods have been used in many fields for the reasons that:

(1) The half-tone image can be displayed by a digital display device,
(2) a hardware configuration of the apparatus is easy, and
(3) satisfactory image quality is attained.

Specifically, as shown in FIGS. 1A and 1B, each of picture cells 8 of an input image is compared with a corresponding one of elements of a threshold matrix 5 to determine if it is white or black by threshold comparison in order to selectively display dots on a display screen 6.

FIG. 1A illustrate the dither method in which each of the picture cells 8 of the input image corresponds to one element of the threshold matrix 5. FIG. 1B illustrates the density pattern method in which each of the picture cells 8 of the input image corresponds to all elements of the threshold matrix 5. Thus, in the density pattern method, each of the picture cells of the input image is displayed by a plurality of cells on the display screen 6.

A difference between the dither method and the density pattern method resides in that one picture cell of the input image corresponds to one element of the threshold matrix in the former method while it corresponds to all elements of the threshold matrix in the latter method, and it is not an essential difference. An intermediate method has also been proposed, in which one picture cell of the input image corresponds to a certain number (for example, 2×2=4 in FIG. 1B) of elements of the threshold matrix.

Accordingly, there is no essential difference between the density pattern method and the dither method. The density pattern method and the intermediate method are hereinafter collectively referred to as the dither method. In such a dither method, the threshold matrix can be prepared in many methods. However, a method or apparatus for allowing a high quality of image output has not been proposed.

SUMMARY OF THE INVENTION

It is an object of the present invention to provide an image processing apparatus which produces a high quality image output.

It is another object of the present invention to provide an image processing apparatus which enables recording or display of a stable half-tone image with high resolution and high tonality.

It is another object of the present invention to provide an image processing apparatus which reproduces a high quality half-tone image with a simple construction.

It is yet another object of the present invention to provide an image processing apparatus which can readily set any desired screen angle.

It is still another object of the present invention to provide an image processing apparatus which causes output dots to form a uniform lattice space.

It is still another object of the present invention to provide an image processing apparatus which can produce a variable magnification half-tone image with a simple construction.

It is a further object of the present invention to provide an image processing apparatus which produces a color image free from moire stripes.

BRIEF DESCRIPTION OF THE DRAWINGS

FIG. 5 shows a schematic perspective view of an input device, FIG. 6 shows a CCD line sensor, FIG. 10 shows a block diagram of a binarizing circuit and a ternarizing circuit, FIGS. 11A–11D show threshold matrices, FIG. 15 shows a density pattern of basic cells, FIGS. 21A and 21B show an 8×8 threshold matrix used for black.

DETAILED DESCRIPTION OF THE PREFERRED EMBODIMENTS

Figure 2:
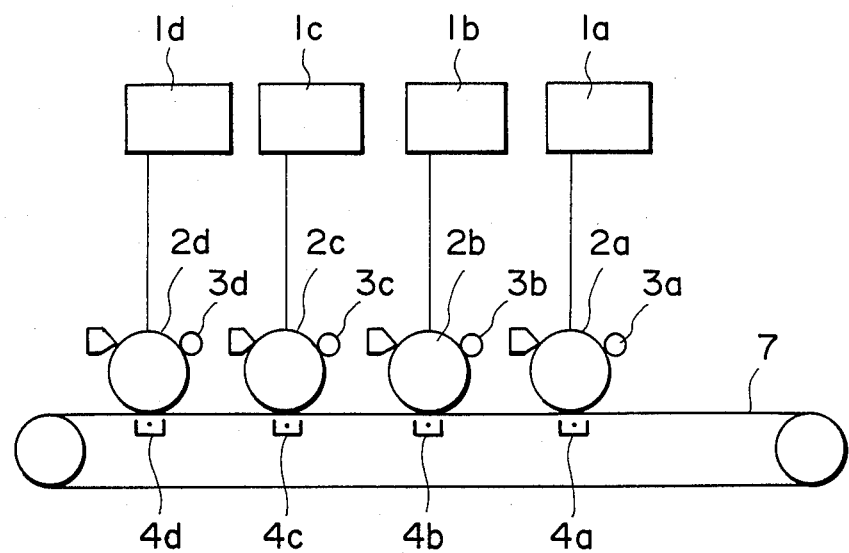
FIG. 2 shows a schematic view of a color image recording apparatus to which the present invention is applicable.

FIG. 2 shows a schematic view of a color image recording apparatus to which the present invention is applicable. In the color image recording apparatus of FIG. 2, color image information is produced by an electronic copying machine (laser bea printer) having a plurality of photosensitive drums, and images of different colors produced by the electronic copying machine are recorded in superposition with different colors sequentially.

In FIG. 2, numerals 1a–1d denote scanning optical systems. Desired image information is read from an image memory, not shown, and it is converted to light beams (laser beams) by the scanning optical systems and the light beams are focused onto photosensitive drums 2a–2d which correspond to cyan (C), magenta (M), yellow (Y) and black (Bl). Developing units 3a–3d are arranged close to the photosensitive drums 2a–2d, and chargers 4a–4d are arranqed to face the photosensitive drums 2a–2d on a side of a conveyer belt 7 which conveys a record paper, not shown. In operation, the modulated light beams from the scanning optical systems 1a–1d are focused onto the photosensitive drums 2a–2d and the focused images are converted to electrostatic latent images by a subsequent electrophotographic process. The electrostatic latent images for the respective colors are developed by the developing units 3a–3d and the developed images are sequentially transferred to the record paper carried on the conveyer belt 7 of the chargers 4a–4d so that a color image is reproduced.

Figure 3:
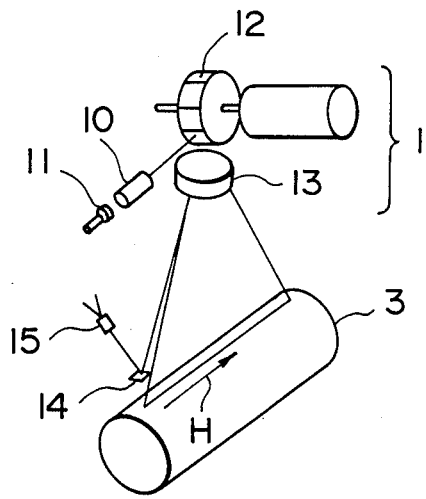
FIG. 3 shows a schematic perspective view of a scanning optical system.

FIG. 3 shows a schematic perspective view of one of the four scanning optical systems 1a–1d shown in FIG. 2. The light beam modulated by a semiconductor laser 11 is collimated by a collimating lens 10 and deflected by a rotating polygon mirror 12. The deflected light beam is focused onto the photosensitive drum 3 by a focusing lens 13 called a fθ lens and the light beam is scanned in H direction (main scan direction). In the light beam scan, the light beam at the beginning of one-line scan is reflected by a mirror 14 and directed to a detector 15. A detection signal from the detector 15 is used as a synchronizing signal in the scan direction H (horizontal direction). This signal is hereinafter referred to as a BD signal or a horizontal synchronizing signal.

Figure 4:
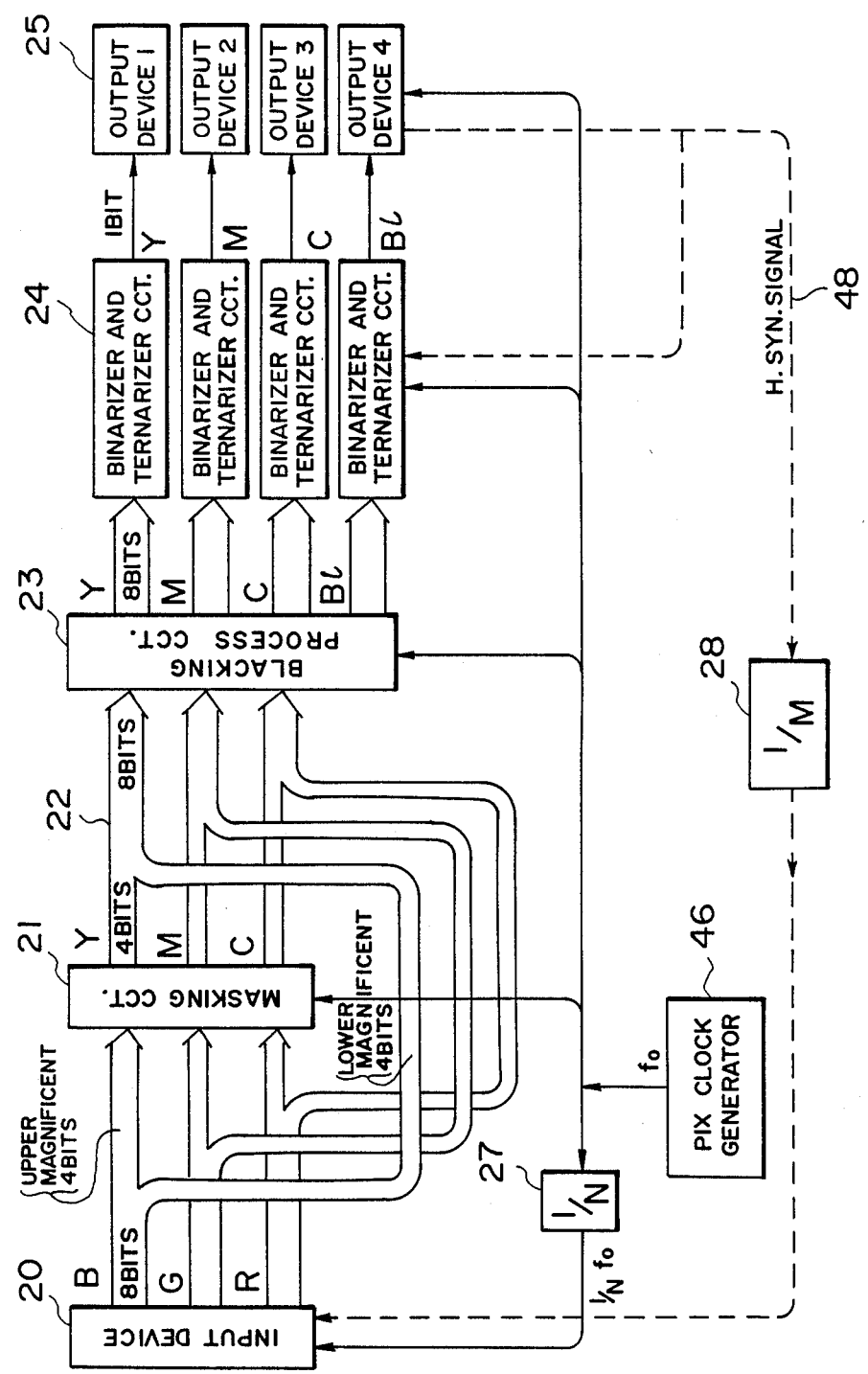
FIG. 4 shows a block diagram of a signal processing system of the present invention.

FIG. 4 shows a block diagram of a signal processing system of the present invention.

Color image signals for blue (B), green (G) and red (R) produced by an input device 20 are digitized by eight bits (256 levels), respectively. The input device 20 is shown in FIG. 5. A light is applied to a color original 30 from a light source 37, and a reflected light is transmitted to a CCD line sensor 32 through a mirror 36 and a lens 31. Thus, the image of the color original 30 is formed on the CCD line sensor 32 and read out with high resolution.

As shown in FIG. 6, the CCD line sensor 32 has 2048 sensors 33 arranged in three rows, and blue (B), green (G) and red (R) stripe filters 34B, 34G and 34R are bonded to the respective rows. The 8-bit picture cell data produced by the input device 20 represents a simultaneous three-color decomposition of the image data at one point on the original.

Figure 7:
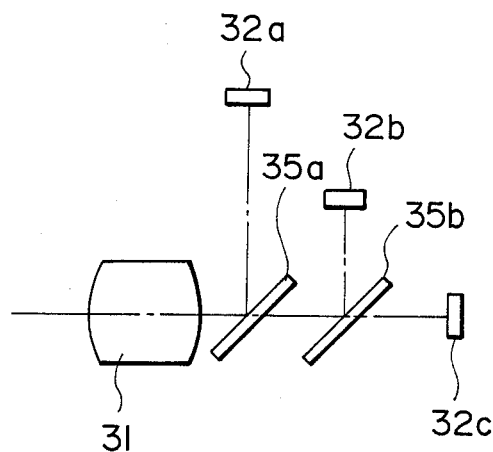
FIG. 7 shows another input device.

FIG. 7 shows another embodiment of the input device 20 used in the present invention. Dichroic filters 35a and 35b for three-color decomposition are arranged behind a lens 31 to decompose the light into three color components, and the images of the respective colors are directed to CCD line sensors 32a, 32b and 32c. With the device of FIG. 7, three-color decomposed image information for one point on the original is produced as a time-serial signal.

Returning to FIG. 4, the blue (B), green (G) and red (R) 8-bit digital signals produced by the input device 20 are processed by a masking circuit. Each of the 8-bit image signals from the input device 20 is divided into a high order four-bit group and a low order four-bit group, and only the high order four bits are masked by the masking circuit 21 and the low order four bits are then combined with the high order four bits to produce an 8-bit data 22.

Figure 8:
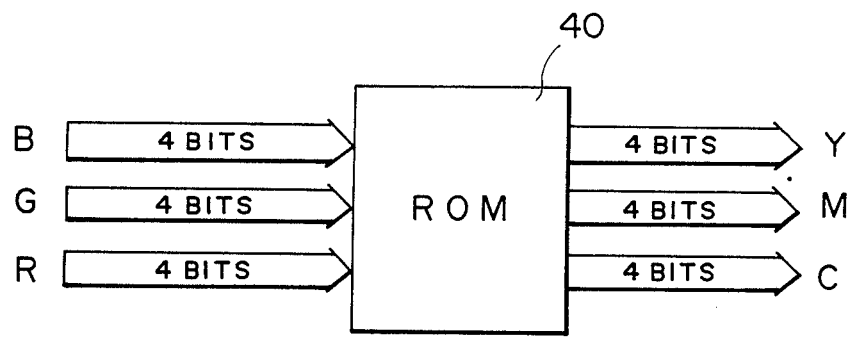
FIG. 8 illustrates masking process.

FIG. 8 illustrates the masking process. The high order four bits of the blue (B), green (G) and red (R) image signals are supplied to a ROM 40 as input address information. Assuming that the blue (B), green (G) and red (R) data are represented by hexadecimal numbers $B = 9$ $G = A$ $R = E$ $BGR = 9AE$ is regarded as one address and the information at that address of the ROM 40 is read out. Accordingly, the ROM 40 has $4 \times 3 = 12$-bit address. The output information from the ROM 40 also has 12 bits, four bits of which represent yellow (Y) data, four bits of which represent magenta (M) data and four bits of which represent cyan (C) data. Assuming that the output data for the input address of 9AE is 357, data of $Y = 3$ $M = 5$ $C = 7$ are produced. The ROM 40 stores all possible values for blue (B), green (G) and red (R).

Since four bits are allocated to each of blue (B), green (G) and red (R), 12-bit data are stored in 12-bit address area ($2^{12} \approx 4K$). Thus, the memory capacity may be small. In this manner, high fidelity color reproduction is attained by the masking process with small memory capacity. The data conversion (content of ROM 40) by the masking process is experimentally determined in accordance with a chrominance characteristic of the recording apparatus and a chrominance characteristic of the input device. The masked yellow (Y), magenta (M) and cyan (C) four-bit data are combined with the separated low order four-bit data to reproduce the 8-bit image data. That is, the non-processed blue (B), green (G) and red (R) low order four-bit data are added to the masked yellow (Y), magneta (M) and cyan (C) four-bit data.

The above masking process is a kind of blocking process for color conversion. The masking for only the high order four bits of the 8-bit image signal means the color conversion in 16 levels, and the addition of the low order four bits means subdivision of the respective level data into 16 levels.

Thus, the masked data can be further subdivided and the tonality of the image is improved.

Figure 9:
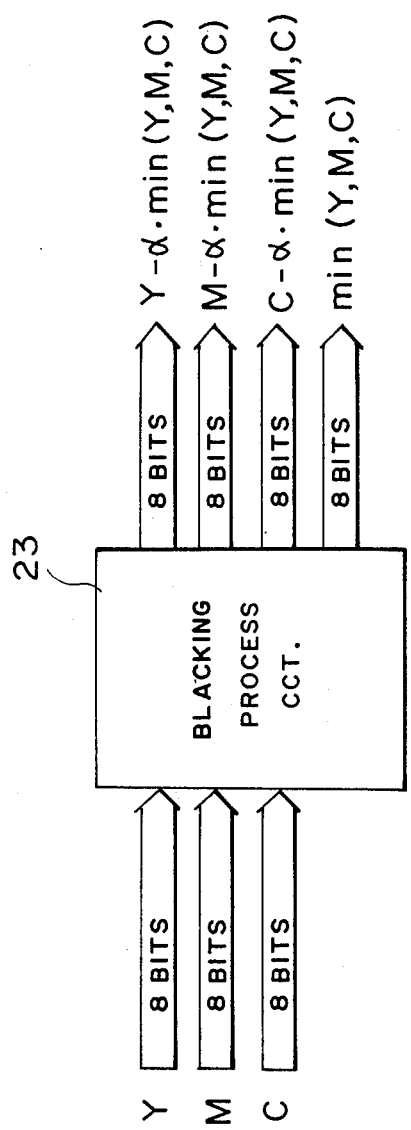
FIG. 9 shows a blackening circuit.

A blackening circuit 23 of FIG. 4 is now explained with reference to FIG. 9. The masked 8-bit image data is processed by the blackening circuit 23 of FIG. 9. (The low order four-bits are converted to the Y, M and C data.) The blackening circuit 23 converts the masked yellow (Y), magenta (M) and cyan (C) 8-bit data in the following manner.

$Y \leftarrow Y - \alpha.\min(Y, M, C)$ $M \leftarrow M - \alpha.\min(Y, M, C)$ $C \leftarrow C - \alpha.\min(Y, M, C)$ $$Bl \leftarrow \min(Y, M, C)$$

It compares the yellow (Y), magenta (M) and cyan (C) 8-bit input data for each picture cell to determine a minimum value $$\min(Y, M, C)$$

and sets a block (Bl) level to the minimum value, and substracts a times ($0 < \alpha \leq 1$) of the black (Bl) level from the yellow (Y), magenta (M) and cyan (C) values. The coefficient $\alpha$ is experimentally determined. The low order four-bits for the respective colors produced by the input device may be inverted by hardware inverters to convert them to complementary color data.

FIG. 10 shows a detail of a binarizer/ternarizer circuit 24 of FIG. 4. For the sake of simplification, the circuit for only one color is explained.

An image data 41 for one color (8-bits) of yellow (Y), magenta (M), cyan (C) and black (Bl) is supplied to a comparator 42, a comparator 44a for binarization (white and black) and a comparator 44b for ternarization (white and gray). Those comparators may be constructed by 8-bit transistor-transistor logic circuits (TTL's such as SN74LS684). Data (threshold values) of the threshold matrix are stored in a ROM 45a and a ROM 45b. Those ROM's are hereinafter referred to as the binarizing ROM 45a and the ternarizing ROM 45b.

The data of the binarizing ROM 45a and the ternarizing ROM 45b are read out in synchronism with the counting by decimal counters 49 and 50. The decimal counters 49 and 50 count a picture cell clock 46 and a BD signal 48, respectively, and sequentially access horizontal addresses and vertical addresses of the threshold matrices through address lines 47a and 47b, respectively, to read out the data. The threshold matrices are of 10×10 construction as shown in FIGS. 11A–11D. A horizontal (main scan) direction of the threshold matrix is represented by H-direction and a vertical (sub-scan) direction is represented by V-direction. The decimal counter 49 determines the H-direction address of the threshold matrix in synchronism with the picture cell clock 46. The decimal counter 50 determines the V-direction address of the threshold matrix in synchronism with the BD signal 48. The decimal counters 49 and 50 each may be constructed by a single conventional TTL such as SN74190.

The binarizing ROM 45a contains two types of threshold matrices as shown in FIGS. 11A and 11B. Similarly, the ternarizing ROM 45d contains two types of threshold matrices as shown in FIGS. 11C and 11D. The binarizing ROM 45a determines white and black levels and the ternarizing ROM 45b determines white and gray levels. The numerals in the threshold matrices represent the threshold levels in decimal numbers. One of the threshold matrices (A) and (B) and one of the threshold matrices (C) and (D) is selected by the input image data 41.

The comparator 42 of FIG. 10 compares the input image data 41 with a preset data 43, and if the input image data 41 $\geq$ the preset data 43, it supplies a "1" output to the binarizing ROM 45a and the ternarizing ROM 45b so that the input data 41 is compared with the matrices (A) and (C).

If the input image data 41 < the preset data 43, the comparator 42 produces a "0" output and the input image data 41 is compared with the matrices (B) and (D). Assuming that the preset data is "4", the values 0–3 of the input image data 41 are compared with the matrices (B) and (D), and the values equal to or larger than four are compared with the matrices (A) and (C). This can be attained by imparting the output of the comparator 42 of FIG. 10 as the high order addresses of the ROM 45a and the ROM 45b. Since each of the outputs of the decimal counters 49 and 50 has four bits, light bits (bits 0–7) are used to scan the H-direction and V-direction addresses of the matrices. Thus, one bit is added to the high order address bit to select one of the matrices (A) and (B) and one of the matrices (C) and (D). Thus, the bits 0–7 of the ROM address are used for address specification and the bit 8 is used for matrix selection.

Thus, since the threshold matrices for comparison are selected in accordance with the density level of the input image data, a high quality output image can be produced.

If the density level of the input image data is low, the unevenness of dots is obstructive unless the output image dot pattern is uniform. In the present embodiment, since the matrices (B) and (D) are selected when the density level is low, a uniform dot pattern is produced.

Figure 12:
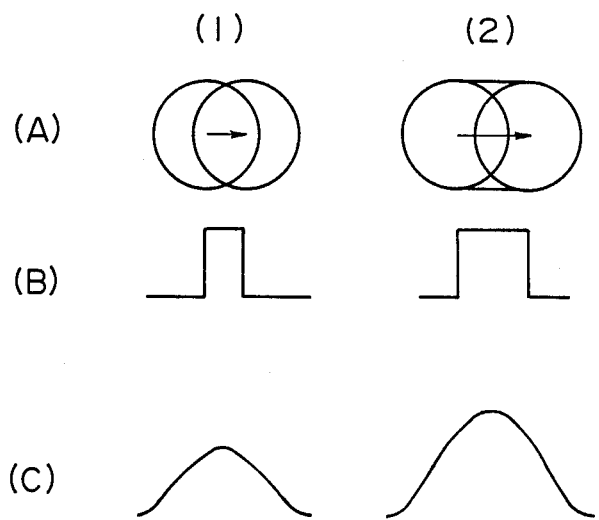
FIG. 12 illustrates binary and ternary outputs.

FIG. 12 illustrates binary and ternary outputs. Numeral (2) in FIG. 12 denotes an output of one picture cell width, FIG. 12A shows a distance of movement of a recording light spot, FIG. 12B shows a width of a modulating pulse for the laser beam and FIG. 12C shows a resulting light intensity distribution. The ternary output in the present invention is produced by pulse width modulation of one-half picture cell width of the laser beam shown by (1) in FIG. 12. As seen from FIG. 12C, the ternary output of the one-half picture cell width is intensity-modulated resulting in variation of peak intensity in accordance with a light spot diameter. As a result, the ternary output provides an intermediate density (gray level). By way of example, in the binary output, the light spot diameter is approximately 50 $\mu$m at a $1/e^2$ intensity point of the peak intensity and the light spot diameter in the ternary output is 25 $\mu$m.

The ternary output by the pulse width has the following advantages.
(1) Intensity of the laser beam emitted may be fixed.
(2) A stable peak intensity is attained by the stable pulse width.
(3) Pulse width can be readily modulated.

The hardware configuration for the ternary output is shown in FIG. 10. The output from the comparator 44b for the ternary output is ANDed with the picture cell clock 46 by an AND circuit 51 and the output of the AND circuit 51 is ORed with the output of the comparator 44a for the binary output by an OR circuit 52. Accordingly, when the binary and ternary outputs are simultaneously produced, the binary output is selected. The ternary output (gray) is selected only when the binary output is at a low level and the ternary output is at a high level.

Figure 13:
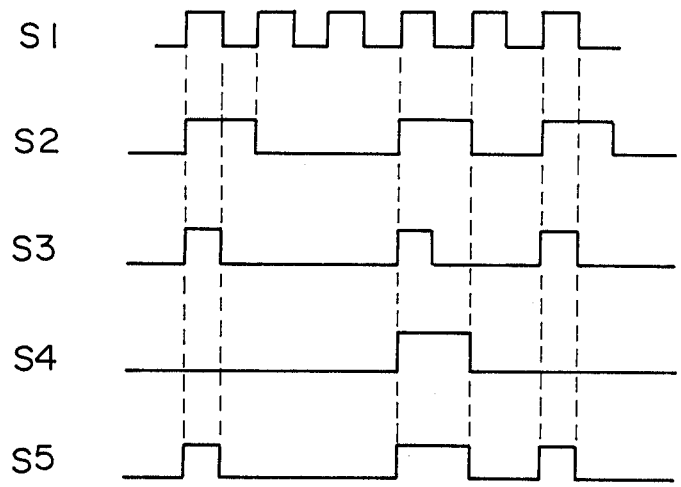
FIG. 13 shows a timing chart for signals in FIG. 10, FIGS. 14A and 14B illustrate basic cells.

FIG. 13 show a timing chart therefor. The ternary output S2 is produced from the comparator 44b in synchronism with the picture cell clock 46 shown by S1. The output S2 and the picture cell clock 46 (S1) are ANDed by the AND circuit to produce the ternary output signal S3 of the one-half picture cell width. If the binary signal shown by S4 is produced, the ternary output and the binary output are ORed to produce the final output signal S5.

In this manner, smooth tonality is attained by the pulse width modulated ternary output.

While the binarization and the ternarization have been explained in the present embodiment, an image of excellent tonality can be reproduced by tetrarization or multi-value processing.

The present invention is not limited to the pulse width modulator since other analog half-tone reproduction methods such as beam intensity modulation may be used to reproduce the half-tone image.

The contents of the threshold matrices of FIG. 11 are next explained.

FIG. 14A shows an aggregation of basic cells of the threshold matrix. The aggregation of five cross-shaped basic cells forms one unit. Each basic cell comprises 20 elements as shown in FIG. 14B. By sequentially blacking the elements of the basic cell the density is represented as shown in FIG. 15. The term basic cell herein used means a pattern of threshold values. The threshold values may differ from basic cell to basic cell.

The five basic cells can be regarded as the threshold matrices of FIG. 11 or 10×10 square matrices by moving in parallel selected ones of the basic cells. Thus, the aggregation of the basic cells of FIG. 14A can be regarded as the 10×10 threshold matrix.

Figure 16:
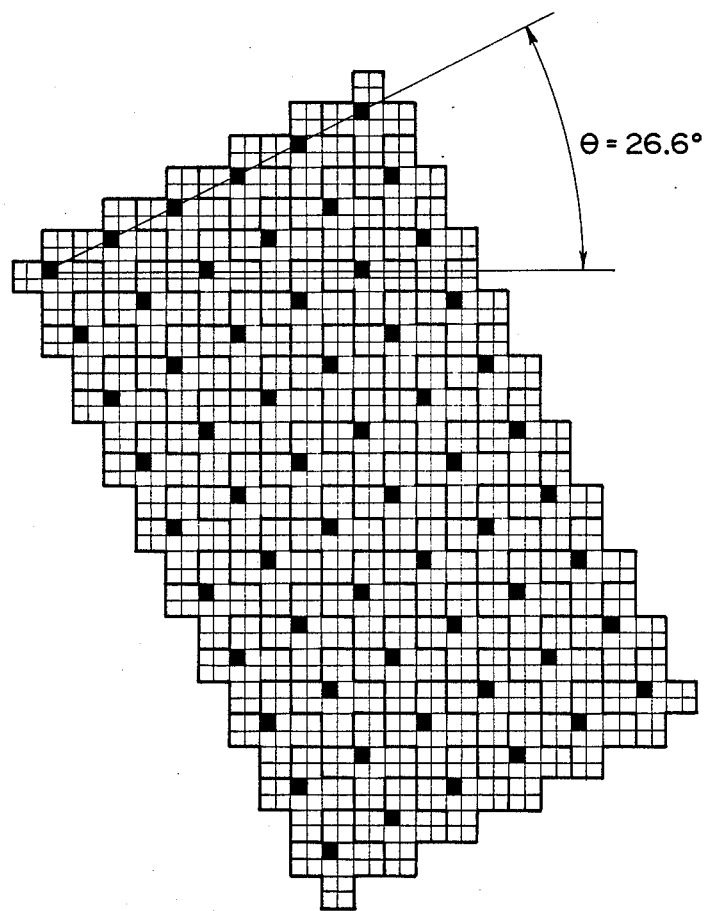
FIG. 16 shows a pattern in which basic cells are connected by density (1) in FIG. 15.

In FIG. 14A, lines connecting corresponding ones of the elements of the five basic cells 1-5 are inclined lines and angle of inclination is 26.6 degrees. In FIG. 16, the basic cells are represented by the density of FIG. 15 (1) and connected together.

The angle of inclination constitutes a screen angle to prevent moire when the color image is outputted. By repetitively connecting the 10×10 threshold matrices (aggregations of the basic cells), a continuous screen angle is attained. The 10×10 threshold matrix has 100 elements (thresholds) and 101 different dots 0–100 by binary data and 202 different dots by ternary data can be produced. In FIG. 15, the black area of the basic cell is gradually increased. This method is called a Fatting method. The threshold matrix of FIG. 11 is blackened by the Fatting method in the following manner when the threshold is equal to or higher than 10. The basic cells 1 and 4 produce the gray level (ternary) and black level (binary) outputs. The basic cells 2 and 3 produce the ternary output and the binary output, respectively. Then, the basic cell 5 produces the binary output.

The reason for adopting the above method are:

1. When the basic cells 1-5 are constructed as shown in FIG. 15 with the same threshold, the number of tones is up to 20. By imparting different thresholds to the basic cells 1-5, the tonality is enhanced. A unit of the resolution when viewed as grid points is one basic cell but a unit of the tonality comprises five basic cells (approximately 100 tones).

2. When the basic cells are sequentially blackened, one element at a time, in the order of 1, 4, 2, 3 and 5, the added blackened cell appears at a course pitch and it is obstructive. By blackening the elements in three groups, the basic cells 1 and 4, the basic cells 2 and 3 and the basic cell 5, the pitch of the grid points is reduced to one half and the dots are not obstructive.

3. Because the ternary output is used, the gradient of the blackening of the basic cells is gentle.

When the density data corresponding to the threshold 4 is supplied, uniform dot patterns can be produced with ternary output. For the thresholds 5-9, the basic cells are blackened one element at a time. In order to enhance the tonality to a relatively bright portion of the image, the blackening is effected finely.

Figure 17:
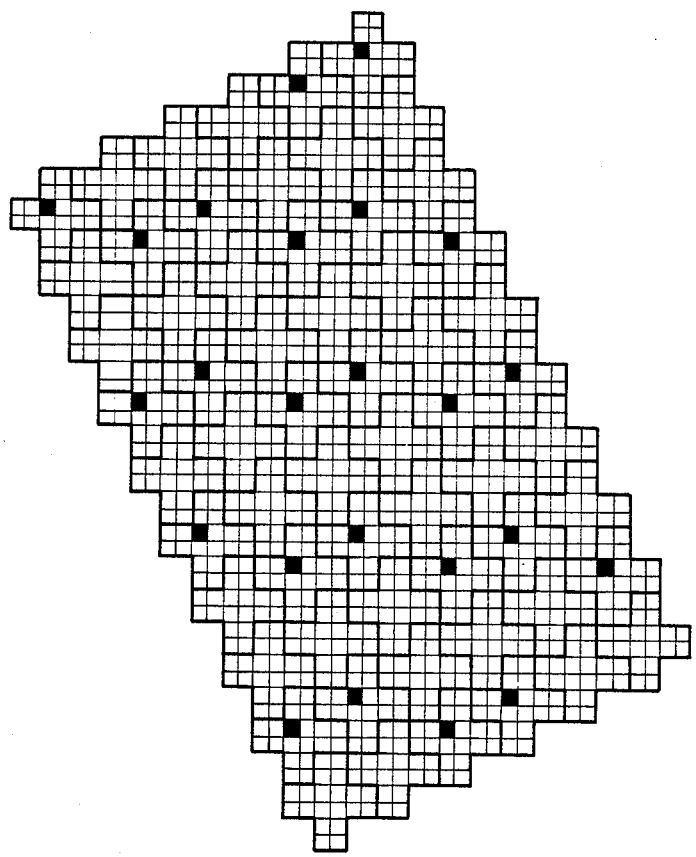
FIG. 17 shows a pattern produced when blacking dots are randomly produced.

The reason for grouping the threshold matrices into (A) and (B), and (C) and (D) is explained below. When only the matrix (A) or (C) is used, the black dots for the first several tones appear randomly as shown in FIG. 17. FIG. 17 shows a pattern when one dot of each of the basic cells 1 and 4 of the aggregation of basic cells of FIG. 14A is blackened. The dot arrangement is random until all of the basic cells 1-5 have been blackened. When such a pattern is developed by the electrophotographing, nonuniformity of density occurs at an area in which dot pitch spatially changes and the tonality is distorted. When an image of a low input density level is to be reproduced by an ink jet printer, the nonuniformity of the recorded dot array is obstructive. Accordingly, it is desirable to form the dots at a uniform density. To this use of the matrix (A) or (C) only is not sufficient.

By the reason described above, the matrix (B) or (D) is provided.

Figure 18:
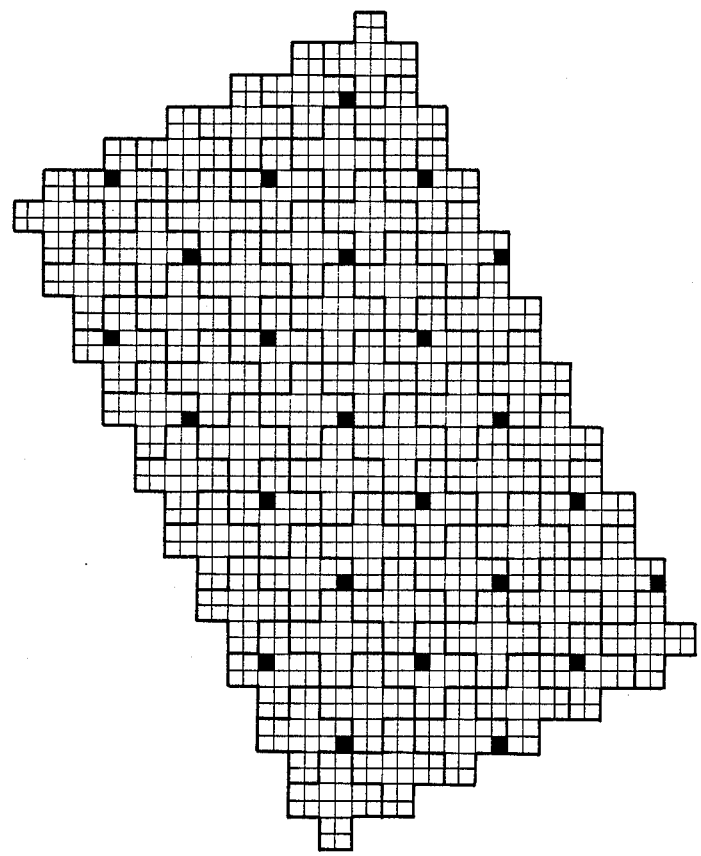
FIG. 18 shows a pattern in which dots are uniformly arranged by the use of the threshold matrices (B) and (D)

FIGS. 11B and 11D show the threshold matrices which are used for the first several tones. The thresholds 1, 2 and 3 of FIGS. 11B and 11D are arranged to construct the dots at a uniform density. The data of the density 3, for example, is compared with the preset data 43 by the comparator 42 as shown in FIG. 10. Assuming that the present data is "4", the data of the density 3 is compared with the matrices (B) and (D). FIG. 18 shows an output pattern of the density 3 when the matrices (B) and (D) are selected. It differs from FIG. 17 in that the dots are uniformly arranged. By appropriately setting the data 43, the matrices (B) and (D) are selected so that the dots are arranged at the uniform density even if the density level of the image is low.

In this manner, the random arrangement of the dots which appears in the first several tones can be eliminated by switching the matrices.

The data of the threshold matrix of FIG. 11 is up to 100. In FIG. 11A, if the image is of very high density, the matrices include five 100 data and five dots are blackened. This is done by the same reason as that for eliminating the nonuniformity of the dot density in the beginning stage. That is, nonuniformity of white area (called white dots) surrounded by black dots is prevented, and reduction of the area of the white dots or reduction of density change due to protrusion of a large recording spot when one dot is blackened is prevented.

In this manner, approximately 100 tones (levels 0–100) of dot configuration are attained.

Figure 19:
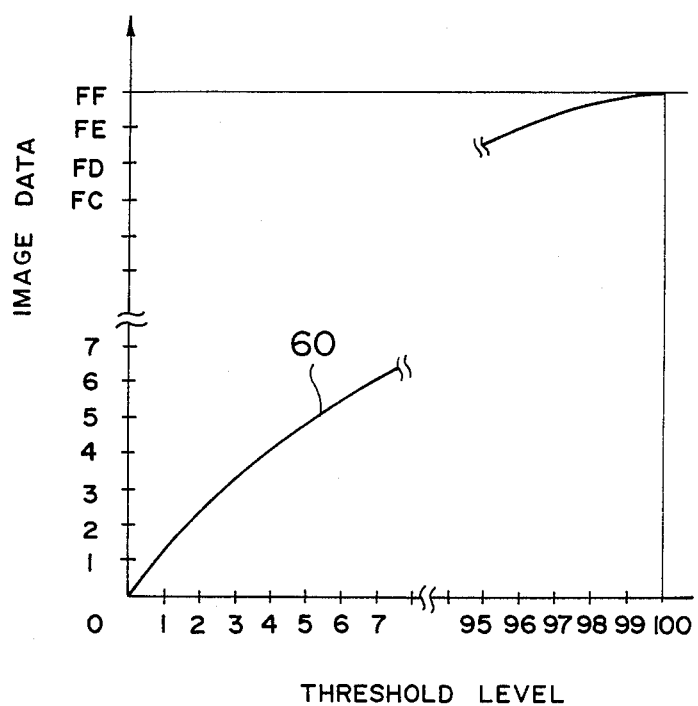
FIG. 19 illustrates a γ-conversion.
Figure 24:
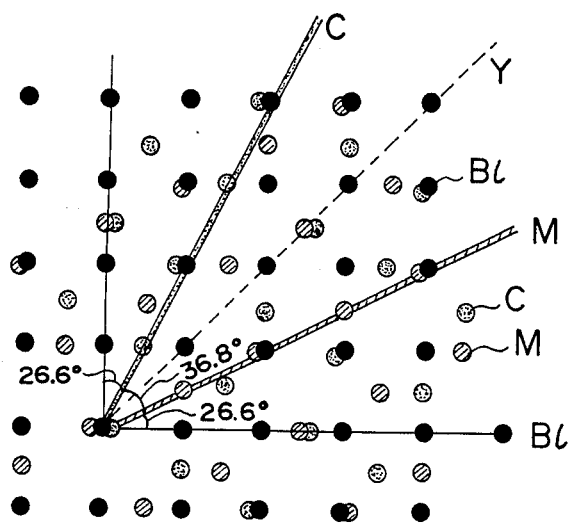
FIG. 24 shows superposition of dots of different colors having screen angles.

The yellow (Y), magenta (M), cyan (C) and black (Bl) input data to the binarizer circuit 24 of FIG. 24 are 8-bit data, respectively, and have 256 tones, respectively. FIG. 19 illustrates a γ-conversion method for converting the 256 levels of image input to 100 levels.

In FIG. 19, the abscissa represents the contents of the elements of the threshold matrices shown in FIG. 11 and the ordinate represents values which can be represented by the 8-bit image data (that is, OO–FF in hexadecimal number or 256 levels). By determining an appropriate curve 60 for executing the γ-conversion (depending on a particular device used), the relation between the image data and the threshold level is determined. It is necessary to update the data of the respective elements of the threshold matrices of FIG. 11 in accordance with the curve 60 of FIG. 19. By the γ-conversion appropriate values are set to the elements (thresholds) of the threshold matrices.

The screen angle for preventing moire for the respective colors is now explained. As described above, by constructing the threshold matrix, as shown in FIG. 11, the screen angle is 26.6 degrees. This is done only for one color (for example, magenta).

Figure 20:
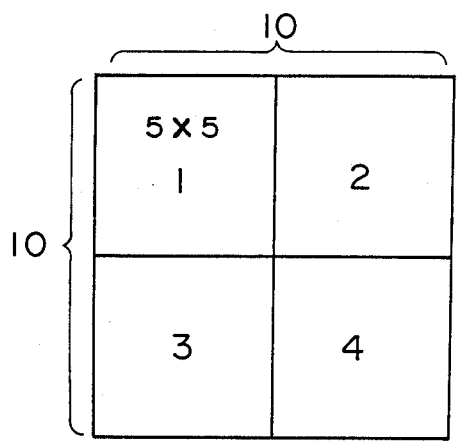
FIG. 20 shows a matrix construction for a screen angle of 0 degrees.
Figure 22A:
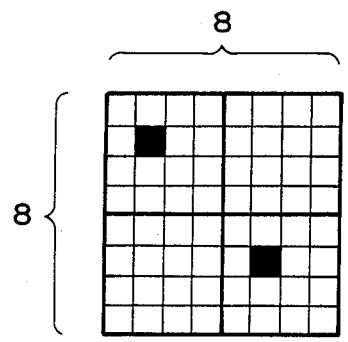
FIGS. 22A and 22B show examples of black record dots.
Figure 22B:
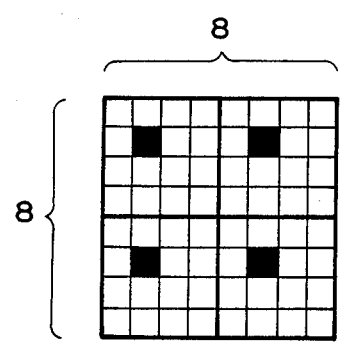

The threshold matrix for cyan (C) is constructed by rotating the threshold matrix of FIG. 11 by 90 degrees. That is, the H-direction and the V-direction of the threshold matrix are exchanged. As a result, the screen angle of 26.6 degrees for magenta is changed to the screen angle of 63.4 degrees. The threshold matrix for black (Bl) is next explained. It is assumed that the black (Bl) output is to have the screen angle of 0 degrees. FIG. 20 shows a construction thereof. In FIG. 20, a 10×10 square matrix is divided by four and resulting 5×5 square matrices are used as basic cells, because there is no need for forming the screen angle as the screen angle is 0 degrees. For the basic cell (5×5 square matrix), the thresholds are determined in the same manner as that for the threshold matrix of FIG. 11 (Fatting method). Because the screen angle is 0 degrees, a smaller 8×8 matrix may be used instead of the 10×10 matrix. This is explained below. In FIG. 21, the black (Bl) is constructed by an 8×8 threshold matrix. The 8×8 matrix has a shorter dot pitch of the grid points than the 10×10 matrix. As a result, the resolution power is improved. FIG. 21A shows the threshold matrix for the ternary output and FIG. 21B shows the threshold matrix for the binary output. For the black (Bl), the 8×8 threshold matrix is used and 65 levels (levels 0–64) of black dots can be represented. The tonality is lower than that of the cyan (C) or magenta (M) because the resolution power is emphasized. It is better for the black (Bl). As shown in FIG. 19, the 8-bit input data (256 levels) is γ-converted to 65 levels. FIG. 22 shows an example of black output dots. FIG. 22A shows an initial stage in which two basic cells are blackened, and in FIG. 22B, four basic cells are blackened.

As seen from FIG. 22, the dot pitch is constant and the dots of uniform density can be produced. Accordingly, the nonuniformity of density and the disturbance of tonality are prevented.

Figure 23A:
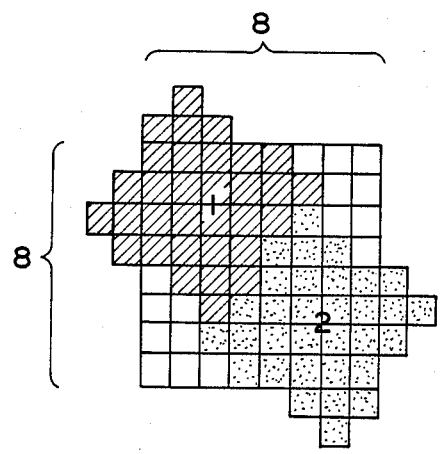
FIGS. 23A and 23B show basic cells for yellow.
Figure 23B:
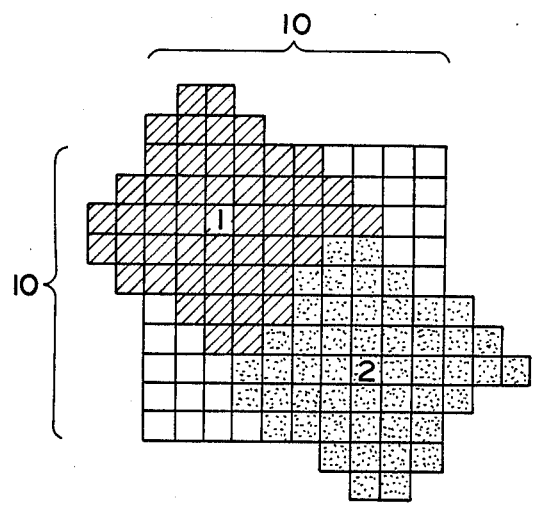

The threshold matrix for yellow (Y) is next explained. The yellow (Y) is outputted at the screen angle of 45 degrees. The yellow record is hard to be noticed and hard to be the subject of moire. Accordingly, no problem arises although an angle difference from cyan (C) or magenta (M) is 18.4 degrees. The screen angle may even be 0 degrees in some cases. The thresholds of the basic cells for yellow (Y) are determined in the same manner as that for the threshold matrix of FIG. 11 (Fatting method). FIGS. 23A and 23B show the basic cells for yellow (Y) in the 8×8 matrix and the 10×10 matrix, respectively. For the yellow (Y), the tonality is important but the resolution is not so important. Accordingly, when the matrix is of 8×8 size, each of the basic cells comprises 32 dots, and when the matrix is of 10×10 size, each of the basic cells comprises 50 dots. The ternarization and the γ-conversion can be done, as is done for other color. In the electrophotography, the tonality is hard to attain as the grid pitch is reduced.

Accordingly, it is desirable that the small basic cell which emphasizes the resolution is used for black (Bl) and the large basic cell which emphasizes the tonality is used for yellow (Y). The present invention is constructed in this manner.

FIG. 24 illustrates superposition of dots of different colors having screen angles. For magenta (M) and cyan (C), the 10×10 matrices are used, and for black (Bl) the 8×8 matrix is used. The yellow (Y) dots are not shown because of little influence. In FIG. 24, the screen angle for magenta (M) is 26.6 degrees, the screen angle for cyan (C) is 63.4 degrees and the screen angle for black (Bl) is 0 degrees. The screen angle for yellow (Y) is shown by a broken line and it is 45 degrees. By imparting different screen angles to the respective colors, an unnatural stripe pattern is prevented.

Figure 25:
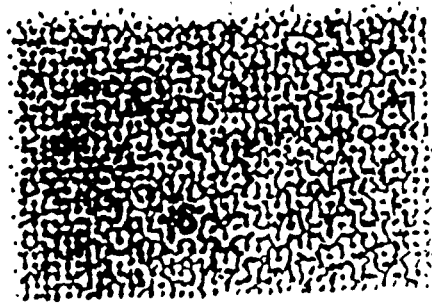
FIG. 25 shows an image reproduced with different screen angles for respective colors.

FIG. 25 shows a reproduced image when different screen angles are imparted to the respective colors. Since the moire frequency is shifted to a high frequency band, the unnatural stripe pattern does not appear. It was confirmed that, by setting the screen angles for the respective colors to those described above, the unnatural stripe pattern does not appear even if a paper is skewed and the screen angles for the respective colors are slightly varied. The present invention is not limited to the above embodiment but also applicable to other colors (for example, only black and gray).

Another embodiment of the present invention is explained below.

Figure 26A:
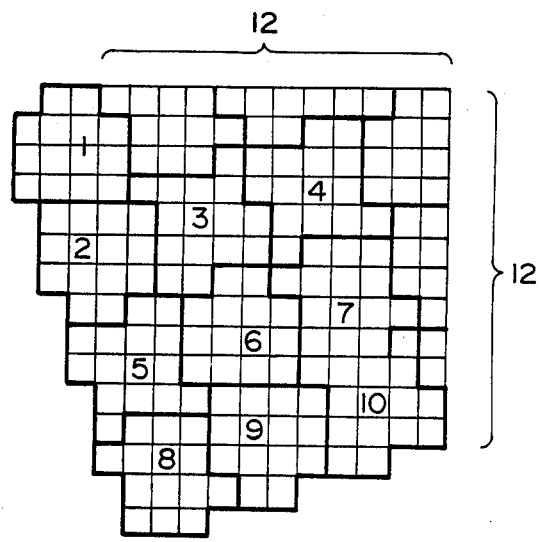
FIGS. 26A and 26B show basic cells in other embodiments.

FIG. 26A shows a 12×12 threshold matrix which comprises 10 basic cells (cells 1–10). The basic cells of FIG. 26A are of special shape and different from that of the basic cells described before. The shapes of the basic cells are different and the number of dots contained in the basic cell is 14 or 15. This does not pose a problem in a recorded state. The matrix has the screen angle of 18.4 degrees. When the matrix is used for cyan (C), for example, the matrix includes three types of dot patterns (A), (B) and (C), as shown in FIG. 27.

Figure 26B:
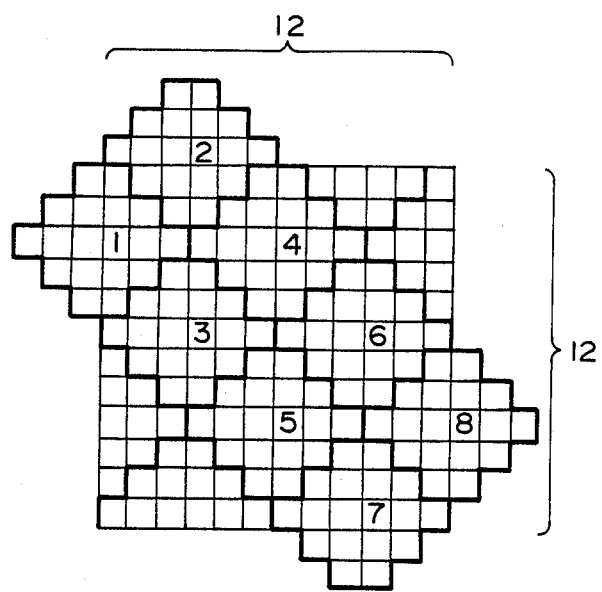
Figure 27A:
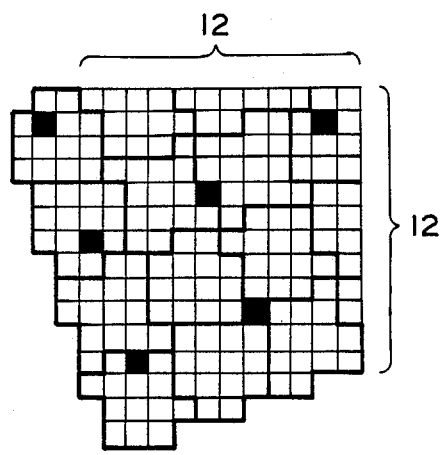
FIGS. 27A–27C show dot patterns in other embodiments.
Figure 27B:
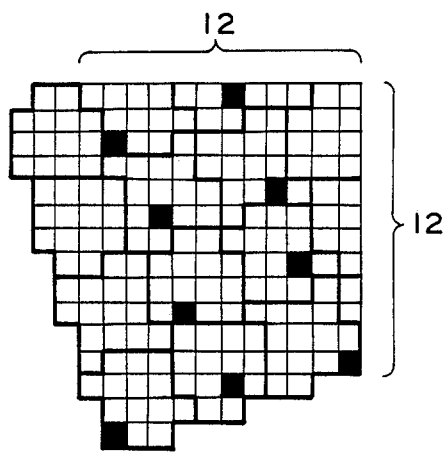
Figure 27C:
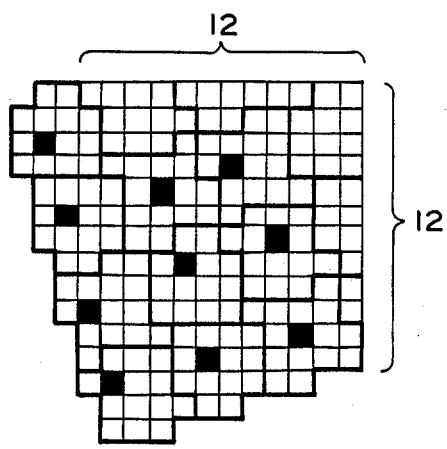
Figure 28A:
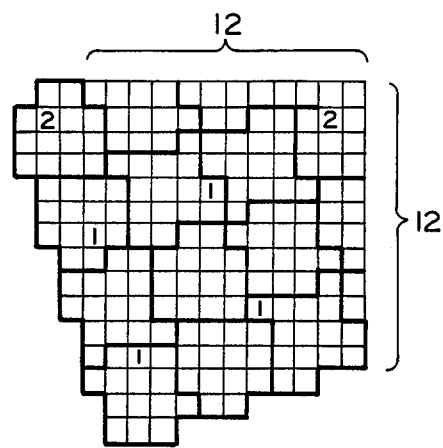
FIGS. 28A, 28B, 29A and 29B show threshold matrices for producing the dot patterns shown in FIGS. 27A and 27B.
Figure 28B:
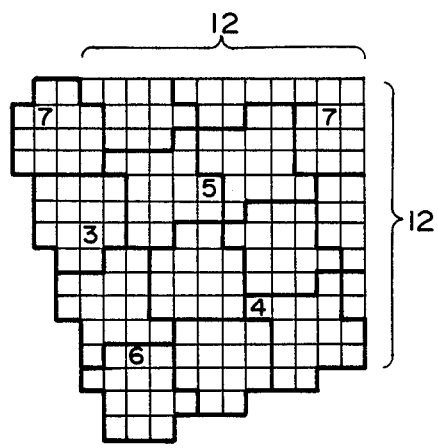
Figure 29A:
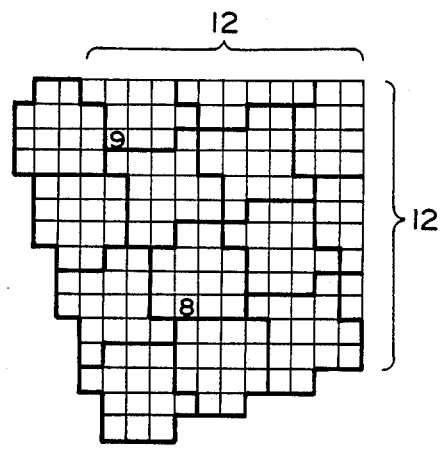
Figure 29B:
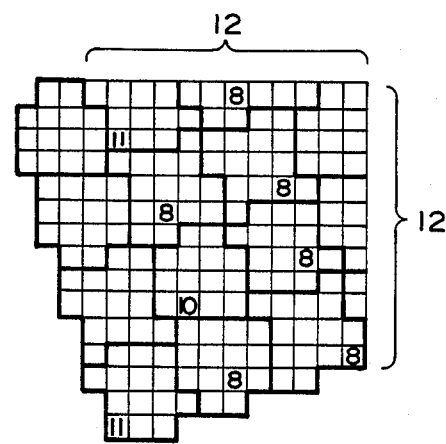

FIGS. 28 and 29 show threshold matrices for producing the output dot patterns (A) and (B) of FIG. 27. The threshold level in a blank area is a maximum level. FIGS. 28A and 29A show the threshold matrices for the ternary output and FIGS. 28B and 29B show the threshold matrices for the binary output. The threshold matrices of FIGS. 28A and 28B are allotted to the input data 0–7, and threshold matrices of FIGS. 29A and 29B are allotted to the input data 8–11. A threshold matrix (not shown) having a center nuclear elements (an element which is first blackened in the basic cell) in the output dot pattern of FIG. 27(C) and having a density pattern thereof constructed by the Fatting method is allotted to the input data of no smaller than 12. For magenta (M), the threshold matrix is rotated by 90 degrees as described above. For yellow (Y), the 12×12 matrix as shown in FIG. 26B is used. In this case, the Fatting method is used, and by setting the center of each basic cell to a minimum threshold level, the screen angle of 45 degrees is obtained. For black (Bl), the threshold matrix having the screen angle of 0 degrees is used as described above. In the present embodiment, two threshold matrices are used for the density data of 0–11 in order to reproduce an image of low density level (bright). According to the present embodiment, like the previous embodiment, the dots are arranged in a uniform density and a high quality of image is reproduced. A hardware configuration of the present embodiment slightly differs from that of the previous embodiment. The counters 49 and 50 in FIG. 10 are modified to bidecimal counters. For black (Bl), an octel or decimal counter is used.

Two comparators 42 are necessary in order to select one of three threshold matrices for the input levels of 0–7, 8–11 and 12 or higher. Thus, two bits are used to select the threshold matrix. Two bits are necessary for the input address to the ROM's 45a and 45b.

Figure 1A:
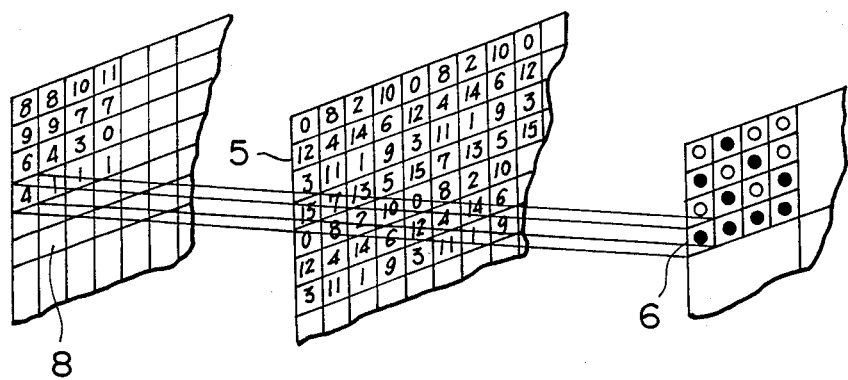
FIGS. 1A and 1B illustrate a dither method and a density pattern method.
Figure 1B:
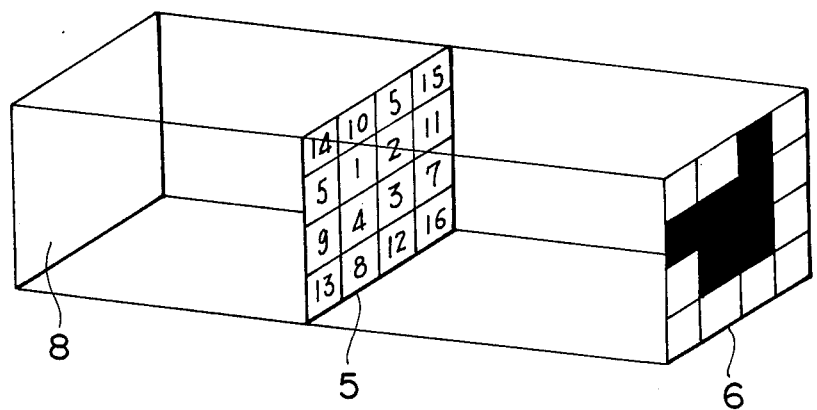

The ternarizing and binarizing circuits of the present invention have thus been described. By supplying the outputs of the binarizing and ternarizing circuits directly to the output device 25 as shown in FIG. 4, a high quality of color image sample is reproduced. When the speed of the input device and the output device are different or the output timing significantly shifts, four memories for yellow (Y), magenta (M), cyan (C) and black (Bl) are used instead of the output device 25. When the dither method as shown in FIG. 1A is used, the 8 bits per picture cell information is stored in the memory as a dot pattern compressed to one bit by the processing circuit of the present invention. The output of the memory is supplied to the color printer of FIG. 2.

The enlargement and the reduction of the image in accordance with the present invention are now explained.

In FIG. 4, the input device 20, the masking circuit 21, the blackening circuit 23, the binarizer/ternarizer circuit 24 and the output device 25 are operated in synchronism with the picture cell clock 46. The output device 25 supplies the horizontal synchronizing signal (BD signal) 48 to the input device 20 and the binarizer/ternarizer circuit 24. Accordingly, the horizontal (H-direction) and vertical (V-direction) outputs of the image are switched in synchronism with the picture cell clock 46 and the horizontal synchronizing signal (BD signal) 48, respectively. By the arrangement of FIG. 4, the signal processing circuit is simplified and it can be readily implemented by firmware. Accordingly, a sequence of signals can be processed at high speed on real time basis. The one-to-N frequency divider 27 and the one-to-M frequency divider 28 are provided to frequency divide the frequencies of the picture cell clock 46 and the horizontal synchronizing signal 48 by the factors of N and M, respectively.

Accordingly, the clock period is multiplied by N and the horizontal synchronizing signal period is multiplied by M. The input device 20 produces the picture cells of the input image in synchronism with the 1/N picture cell clock 46 and the 1/M horizontal synchronizing signal 48.

Assuming that $N=M=4$, the picture cell clock of the period multiplied by four and the horizontal synchronizing signal of the period multiplied by four are applied to the input device 20 so that the input device 20 produces the image data at one-quarter speed.

Since the other circuits are operated at the normal speed, the output device 25 produces $4\times 4$ picture cells M data while the input device 20 produces one picture cell of data, assuming that the input device 20 reads the same line four times repetitively.

When $N=M=1$, the output device 25 produces one picture cell of data while the input device 20 produces one picture cell of data. Accordingly, the dither method shown in FIG. 1A is carried out.

Thus, for a given size of the picture cells produced by the input device 20, an image horizontally magnified by a factor of N and vertically magnified by a factor of M is produced. Since the dot pattern recorded is constant, the dots are not coarsened by the enlargement. As a result, a high quality of enlarged or reduced image can be readily produced.

In the present invention, the 8-bit input image data is used by way of example and the data may be determined depending on the characteristics of the input device and the output device. While the output device described is of electrophotographic type which modulates the semiconductor laser beam, an ink jet printer, a thermal transfer printer or an electrostatic printer also may be used. In this case, the ternary pulse width output is supplied in the sub-scan direction. The present invention is not limited to the constructions shown in FIGS. 4 and 10 but any other signal processing circuit may be used as long as the principal means of the signal processing is maintained.

As described hereinabove, the present invention provides the image processing apparatus which produces a high resolution and high tonality image output.

The present invention is not limited to the above embodiments but various modifications can be made within the scope defined in the appended claims.

What we claim is:

1. An image processing apparatus for producing a dotted image on a record medium from image data comprising:
    means for sequentially inputting the image data;
    means for processing the image data sequentially inputted by said inputting means without repeatedly using said image data to output a pulse-width modulated signal for changing a dot size of a dotted image to be produced; and
    first and second threshold matrices;
    wherein said processing means halftone process the image data by using said first and second threshold matrices relating to the same image data, and outputs the pulse width modulated signal.

2. The apparatus corresponding to claim 1, wherein said first threshold matrix is utilized to produce a first modulated signal having a first pulse-width, and wherein said second threshold matrix is utilized to produce a second modulated signal having a second pulse-width.

3. The apparatus according to claim 2, wherein said processing means includes:
    first means for comparing the image data from said inputting means with a threshold signal corresponding to said first threshold matrix to produce said first modulated signal;
    second means for comparing the image data from said inputting means with a threshold signal corresponding to said second threshold matrix to produce said second modulated signal; and
    means for combining said first modulated signal with said second modulated signal to produce said pulse-width modulated signal.

4. The image processing apparatus according to claim 1, further comprising:
    means for modulating an optical beam in response to the pulse-width modulated signal and scanning the record medium with the optical beam to record an image thereon; and
    means for detecting a position of the optical beam scan and producing a synchronizing signal in accordance with the detected result;
    wherein said processing means (i) produces first and second threshold signals corresponding, respectively, to said first and second threshold matrices in synchronism with the synchronizing signal and (ii) compares the image data with said first and second threshold signals.

5. The apparatus according to claim 1, wherein said processing means is adapted to receive a plurality of color image data, and wherein said processing means processes the color image data by utilizing a threshold matrix having a first size for first color image data and utilizing a threshold matrix having a second size for second color image data.

6. The apparatus according to claim 1, wherein said processing means is capable of receiving a plurality of color image data, and wherein said processing means processes the color image data by utilizing a threshold matrix having a first screen angle for first color image data and by utilizing a threshold matrix having a second screen angle for second color image data.

7. The apparatus according to claim 1, further comprising a third threshold matrix, wherein said image processing means processes the image data by utilizing said first threshold matrix and said third threshold matrix, and wherein said first and third threshold matrices are exchangeable in accordance with a level of the image data from said inputting means.

8. An apparatus according to claim 1, wherein at least one of said first threshold matrix and said second threshold matrix has a plurality of predetermined threshold levels.

9. An image processing apparatus for producing an image from image data comprising:
means for generating image data; and
means for processing the image data from said generating means to produce a reproduction signal;
wherein said processing means includes first dither conversion means adapted to store data for first dither conversion and second dither conversion means adapted to store data for second dither conversion;
said respective data for first and second dither conversions in said first and second dither conversion means corresponding, respectively, to first and second threshold dither matrices;
said first and second threshold matrices corresponding, respectively, to first and second colors; and
wherein each of said first and second threshold matrices comprises a plurality of basic cells, each cell having a plurality of thresholds arranged in a predetermined pattern, and said first and second threshold matrices containing different numbers of thresholds.

10. The image processing apparatus according to claim 9, wherein said basic cells are continuously arranged to form a predetermined screen angle.

11. The image processing apparatus according to claim 10, wherein said first threshold matrix comprises a plurality of basic cells having different thresholds.

12. The image processing apparatus according to claim 11, wherein said first threshold matrix comprises a plurality of basic cells having the same shape.

13. The image processing apparatus according to claim 9, wherein said first dither conversion means includes first storage means for storing threshold signals corresponding to said first threshold matrix, said second dither conversion means includes second storage means for storing threshold signals corresponding to said second threshold matrix, said generating means includes means for generating first and second color image data, and said processing means includes a first comparator for comparing said first color image data with threshold signals of said first threshold matrix to produce a first reproduction signal and a second comparator for comparing said second color image data with threshold signals of said second threshold matrix to produce a second reproduction signal.

14. The image processing apparatus according to claim 9, further comprising:
means for modulating an optical beam and means for detecting a position of an optical beam scan;
wherein said processing means includes means for outputting said image signal as a pulse-width modulated signal,
said modulating means modulating the optical beam in response to the pulse-width modulated signal and scanning the record medium by the optical beam to record an image thereon, and
said detecting means detecting a position of the optical beam scan and producing a synchronizing signal in accordance with the detected result; and
wherein said processing means produces the data stored at said first and second dither conversion means in synchronism with the synchronizing signal.

15. An image processing aparatus for producing an image on a record medium comprising:
means for generating image data;
means for processing the image data from said generating means, said processing means halftone processing said image data and forming a reproduction signal by utilizing first and second threshold matrices, said processing means including discriminating means for discriminating whether the image data from said generating means exceeds a predetermined level; and
means for selecting one of said first and second threshold matrices in accordance with a discrimination result of said discrimination means.

16. The image processing apparatus according to claim 15, wherein said processing means includes first dither conversion means adapted to store data for a first dither conversion and second dither conversion means adapted to store data for a second dither conversion, said respective data for first and second dither conversions in said first and second dither conversion means corresponding to said first and said second threshold dither matrices, and wherein said selecting means selects one of said first and second dither conversion means.

17. The image processing apparatus according to claim 16, wherein said first dither conversion means includes first storage means for storing threshold signals corresponding to said first threshold matrix, said second dither conversion means includes second storage means for storing threshold signals corresponding to said second threshold matrix, and said processing means includes a comparator for comparing said image data with a threshold signal of a selected dither conversion means.

18. The image processing apparatus according to claim 16, further comprising:
means for modulating an optical beam and means for detecting a position of an optical beam scan;
wherein said binary coding means includes means for outputting said image as a pulse-width modulated signal;
said modulating means modulating the optical beam in response to the pulse-width modulated signal and scanning the record medium by the optical beam to record an image thereon, and
said detecting means detecting the position of the optical beam scan and producing a synchronizing signal in accordance with the detected result; and
wherein said binary coding means produces data corresponding to one of said first or second threshold matrices in synchronism with said synchronizing signal.

19. An image processing apparatus for producing an image from image data comprising:
means for generating image data; and
means for processing the image data from said generating means to produce a reproduction signal;
said processing means including first dither conversion means adapted to store data for first dither conversion and second dither conversion means adapted to store data for second dither conversion;
said respective data for first and second dither conversions in said first and second dither conversion means corresponding, respectively, to first and second threshold dither matrices; and
said first and second threshold matrices corresponding, respectively, to first and second colors;
wherein said first threshold matrix comprises a plurality of first basic cells each having a plurality of thresholds thereof arranged in a predetermined pattern, and said second threshold matrix comprises a plurality of second basic cells each having a plurality of thresholds thereof arranged in a predeteremined pattern, said first and second basic cells being different in shape or size from each other, said first and second threshold matrices containing different numbers of thresholds.

20. The image processing apparatus according to claim 19, wherein said first basic cells are continuously arranged to form a first screen angle, and said second basic cells are continuously arranged to form a second screen angle different from said first screen angle.

21. The image processing apparatus according to claim 20, wherein said first threshold matrix comprises a plurality of first basic cells having different thresholds, and said second threshold matrix comprises a plurality of second basic cells having different thresholds.

22. The image processing apparatus according to claim 21, wherein said first threshold matrix comprises a plurality of basic cells of the same shape.

23. The image processing apparatus according to claim 19, further comprising:
means for modulating an optical beam and means for detecting a position of an optical beam scan;
wherein said binary coding means includes means for outputting said image signal as a pulse-width modulated signal,
said modulating means modulating the optical beam in response to the pulse-width modulated signal and scanning the record medium by the optical beam to record an image thereon, and
said detecting means detecting a position of the optical beam scan and producing a synchronizing signal in accordance with the detected result; and
wherein said processing means produces the data stored at said first and second dither conversion means in synchronism with the synchronizing signal.

24. An image processing apparatus for producing an image on a record medium from image data comprising:
means for generating image data;
means for processing the image data generated by said generating means to output a pulse-width modulated signal for changing a dot size of a dotted image to be produced;
means for modulating an optical beam in response to the pulse-width modulated signal and scanning the record medium with the optical beam to record an image thereon; and
means for detecting a position of the optical beam scan and producing a synchronizing signal in accordance with the detected result;
wherein said processing means includes means for generating a threshold signal and means for generating the pulse-width modulated signal in accordance with the image data and the threshold signal; and
wherein said threshold signal generating means generates the threshold signal in synchronism with the synchronizing signal.

25. An image processing apparatus according to claim 24, wherein said threshold signal generating means includes first dither signal generating means for generating a first dither signal for forming a first pulse-width modulated signal and second dither signal generating means for generating a second dither signal for forming a second pulse-width modulated signal, the first and second threshold signals corresponding to respective first and second threshold matrices which are different from each other.

26. An image processing apparatus according to claim 24, wherein said image data generating means includes means for outputting digital color image data of a predetermined number of bits and means for executing color correction relating to said digital color image data.

* * * * *

UNITED STATES PATENT AND TRADEMARK OFFICE
CERTIFICATE OF CORRECTION

PATENT NO. : 4,783,837

DATED : November 8, 1988

INVENTOR(S) : NAOTO KAWAMURA, ET AL.

Page 1 of 3

It is certified that error appears in the above-identified patent and that said Letters Patent is hereby corrected as shown below:

IN THE DRAWINGS

Sheet 3, Figure 4, "MAGNIFICENT" should read --SIGNIFICANT-- (both occurrences).

COLUMN 3

Line 3, "bea" should read --beam--.
    Line 16, "arranqed" should read --arranged--.

COLUMN 5

Line 8, "block (Bl)" should read --black (Bl)--.
    Line 9, "substracts a" should read --subtracts $\alpha$--.
    Line 24, "(TTL's" should read --(TTL's)--.
    Line 49, "ROM 45d" should read --ROM 45b--.

COLUMN 6

Line 6, "light bits" should read --eight bits--.
    Line 40, "bv" should read --by--.

COLUMN 7

Line 46, "reason" should read --reasons--.

UNITED STATES PATENT AND TRADEMARK OFFICE
CERTIFICATE OF CORRECTION

PATENT NO. : 4,783,837

DATED : November 8, 1988

INVENTOR(S) : NAOTO KAWAMURA, ET AL.

Page 2 of 3

It is certified that error appears in the above-identified patent and that said Letters Patent is hereby corrected as shown below:

COLUMN 8

Line 16, "this" should read --this end,--.
    Line 50, "FIG. 24" should read --FIG. 4--.

COLUMN 10

Line 40, "elements" should read --element--.
    Line 62, "octel" should read --octal--.

COLUMN 11

Line 31, "real" should read --real- --.

COLUMN 12

Line 30, "corresponding" should read --according--.

COLUMN 14

Line 17, "aparatus" should read --apparatus--.
    Line 57, "binary coding means" should read --processing means--.
    Line 58, "image as" should read --image data as--.
    Line 67, "binary coding means" should read --processing means--.

UNITED STATES PATENT AND TRADEMARK OFFICE
CERTIFICATE OF CORRECTION

PATENT NO. : 4,783,837

DATED : November 8, 1988

INVENTOR(S) : NAOTO KAWAMURA, ET AL.

Page 3 of 3

It is certified that error appears in the above-identified patent and that said Letters Patent is hereby corrected as shown below:

COLUMN 15

Line 24, "predeteremined" should read --predetermined--.
Line 45, "binary coding means" should read --processing means--.

Signed and Sealed this

Eighteenth Day of July, 1989

Attest:

DONALD J. QUIGG

Attesting Officer

Commissioner of Patents and Trademarks